United States Patent
VanBlon et al.

(10) Patent No.: US 10,282,908 B2
(45) Date of Patent: May 7, 2019

(54) SYSTEMS AND METHODS FOR PRESENTING INDICATION(S) OF WHETHER VIRTUAL OBJECT PRESENTED AT FIRST DEVICE IS ALSO PRESENTED AT SECOND DEVICE

(71) Applicant: Lenovo (Singapore) Pte. Ltd., New Tech Park (SG)

(72) Inventors: Russell Speight VanBlon, Raleigh, NC (US); Justin Tyler Dubs, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 5 days.

(21) Appl. No.: 15/381,688

(22) Filed: Dec. 16, 2016

(65) Prior Publication Data

US 2018/0174363 A1    Jun. 21, 2018

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01); *G06T 2219/024* (2013.01)

(58) Field of Classification Search
CPC ............. G06T 19/006; G06T 2219/004; G06T 2219/024
See application file for complete search history.

(56) References Cited

U.S. PATENT DOCUMENTS

| | | | | |
|---|---|---|---|---|
| 6,215,498 B1* | 4/2001 | Filo | .......................... | G06F 3/011 345/419 |
| 9,195,302 B2* | 11/2015 | Matsuda | ................... | G06F 3/13 |
| 9,818,228 B2* | 11/2017 | Lanier | .................... | H04W 4/043 |
| 2013/0083173 A1* | 4/2013 | Geisner | .................... | G06F 3/013 348/51 |
| 2013/0135180 A1* | 5/2013 | McCulloch | ............. | G06F 3/012 345/8 |
| 2013/0293468 A1* | 11/2013 | Perez | ....................... | G06F 3/033 345/158 |
| 2013/0328762 A1* | 12/2013 | McCulloch | .......... | G02B 27/017 345/156 |
| 2014/0002444 A1* | 1/2014 | Bennett | .................... | G06F 3/012 345/419 |
| 2014/0091984 A1* | 4/2014 | Ashbrook | ............. | G06F 3/1462 345/2.1 |
| 2016/0270656 A1* | 9/2016 | Samec | ................... | A61B 3/085 |
| 2016/0300392 A1* | 10/2016 | Jonczyk | ................ | G06T 19/003 |
| 2017/0003829 A1* | 1/2017 | Wilde | .................... | H04L 67/125 |
| 2017/0064374 A1* | 3/2017 | Eim | ..................... | G06F 3/04817 |

OTHER PUBLICATIONS

Ohshima et al., AR2Hockey: A Case Study of Collaborative Augmented Reality, Dec. 1998, EEE Computer Society, pp. 1-8.*

* cited by examiner

*Primary Examiner* — Robert J Craddock
(74) *Attorney, Agent, or Firm* — John M. Rogitz; John L. Rogitz (57) ABSTRACT

In one aspect, a first device includes a housing, a processor coupled to the housing, a first display coupled to the housing and accessible to the processor, and storage coupled to the housing and accessible to the processor. The storage bears instructions executable by the processor to present, on the first display, a virtual object. The instructions are also executable by the processor to visually indicate, on the first display, whether the virtual object is observable via a second display of a second device that is different from the first device.

20 Claims, 6 Drawing Sheets

SYSTEMS AND METHODS FOR PRESENTING INDICATION(S) OF WHETHER VIRTUAL OBJECT PRESENTED AT FIRST DEVICE IS ALSO PRESENTED AT SECOND DEVICE

BACKGROUND

As recognized herein, different augmented reality users and/or virtual reality users can sometimes each see the same virtual object as presented on the respective displays of the respective devices each user is using to observe such content. However, sometimes a virtual object may be viewable via a first user's device but not a second user's device owing to restrictions and permissions for viewing the virtual object.

As also recognized herein, it is often difficult for the first user to tell whether the second user can see the same virtual object as the first user when they are each using their own device, and hence the first user might not know whether the second user is sharing in the same experience with the first user and seeing the same virtual object so that the first user can enjoy the experience with the second user and talk to the second user afterwards about the virtual object. Furthermore, conversing during the experience about whether the virtual object can be seen is cumbersome and distracting, and sometimes not possible if each user is using headphones to immerse themselves in the augmented or virtual world. There are currently no adequate solutions to the foregoing computer-related problem.

SUMMARY

Accordingly, in one aspect a first device includes a housing, a processor coupled to the housing, a first display coupled to the housing and accessible to the processor, and storage coupled to the housing and accessible to the processor. The storage bears instructions executable by the processor to present, on the first display, an augmented reality object. The instructions are also executable to visually indicate, on the first display, whether the augmented reality object is observable via a second display of a second device that is different from the first device.

In another aspect, a method includes presenting a virtual object on a first display and indicating, on the first display, whether the virtual object is being presented via a second device different from the first device.

In still another aspect, an apparatus includes a first processor, a network adapter, and storage bearing instructions executable by a second processor for determining whether a virtual object presented on a first display is also presentable on a second display different from the first display. The instructions are also executable by the second processor for presenting, on the first display, an indication regarding whether the virtual object is presentable on the second display. The first processor transfers the instructions to the second processor over a network via the network adapter.

The details of present principles, both as to their structure and operation, can best be understood in reference to the accompanying drawings, in which like reference numerals refer to like parts, and in which:

DETAILED DESCRIPTION

The present application relates to allowing a user interacting with a virtual object via an augmented reality (AR) device to identify whom else can and cannot see the same object using their own device, while allowing the user to share the object if desired. The user's device may detect if another person can see the same virtual object(s) as the user, and then indicate if that other person can see the same virtual object or not.

For example, if the user were discussing a virtual laptop appearing as though sitting on a real-world table, the user's device may communicate with other nearby AR devices to determine who else can see the virtual laptop. The user may then receive a visual and/or audio notification on his or her own device indicating which people can and/or cannot see the virtual laptop.

Public metadata about virtual objects may be created and maintained at a server or another device. The metadata may include descriptive text and/or generic icons (e.g., a generic version of a laptop) to present in place of the virtual object itself that is associated with the metadata. Text describing the virtual object and generic icons may be useful because some virtual objects may be secure and have little or no other metadata made public, or that other metadata may be accessible to only a sub-set of other devices until the virtual object is shared by the owner or otherwise made public. Each person that owns or controls a given virtual object may specify the amount of metadata to make public.

Virtual objects may be accessed for presentation at one device as stored at another user's device, and/or as stored via a cloud-based service where the virtual objects may be stored, maintained, and accessed/shared. In some embodiments, a combination of storage at both a user's device and using the cloud-based service may be used to provide detailed object data via the network server for the cloud-based service, while providing basic information and managing access to the object locally at the user's device so that, for example, when another device is within a threshold distance to the user's device (that is presenting a virtual object), the other user may also be permitted see the virtual object via his or her own device.

Indications that indicate certain people can see a virtual object, or that indicate certain people cannot see the virtual object, may be presented based on which of the two indication types allows for less total indications to be presented on the display of the user's device at a given time. Or, both indication types may be presented at a given time. Additionally, in some embodiments no more than a threshold number of indications of either type, or in total, may be presented.

Permissions for a given virtual object may be assigned when the object is shared by a user to allow viewing access, interaction access, ability to also modify permissions, etc.

In some examples, the AR device used by the user may be an AR headset. In other examples, the AR device may be a smartphone or tablet computer executing AR software such as Google's Tango. In embodiments where a non-headset device is used (such as a smartphone) and a virtual object is available, a notification may be provided at the non-headset device indicating that the user should use a camera feed from the device to view the real world around them to request access and view the virtual object using the device.

Indications of whom else can or cannot see a given virtual object may be presented whenever a user is within a threshold distance with his or her device of where the virtual object is supposedly located in the real world, even if the virtual object is not currently within the user's field of view. Additionally or alternatively, such indications may be presented responsive to the real-world location of where the virtual object is supposedly located coming into the user's field of view, as determined based on input from a camera on the user's device that is assumed to be the field of view of the user.

Further regarding the timing of when an indication of whether others can see a virtual object may be presented, the indication may be presented responsive to interaction by the user with the virtual object. Interaction may be looking at the virtual object, as identified based on input from a camera on the user's device that images the user's eyes and execution of eye tracking software on the input to identify a gaze direction and depth. Interaction may also be talking about the virtual object, as identified based on input from a microphone on the user's device that senses sound from the user and execution of voice recognition software on the input to identify the virtual object as being talked about. As another example, interaction may be the user pointing, using his or her finger, to the virtual object as it appears to the user to exist within the real world, as identified based on input from a camera in the user's environment that images the user and execution of gesture recognition software on the input to identify the user as pointing at the virtual object. However, in other embodiments an indication may be presented as soon as it becomes available for presentation, such as when permission is granted to view the virtual object or when the user enters a real-world room in which the virtual object is located.

Directional knowledge by one device of other devices that are proximate to it may be used to correlate each device to a different user and to create a layout of users/devices. Building mapping techniques may also be used for such purposes.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

Figure 1:
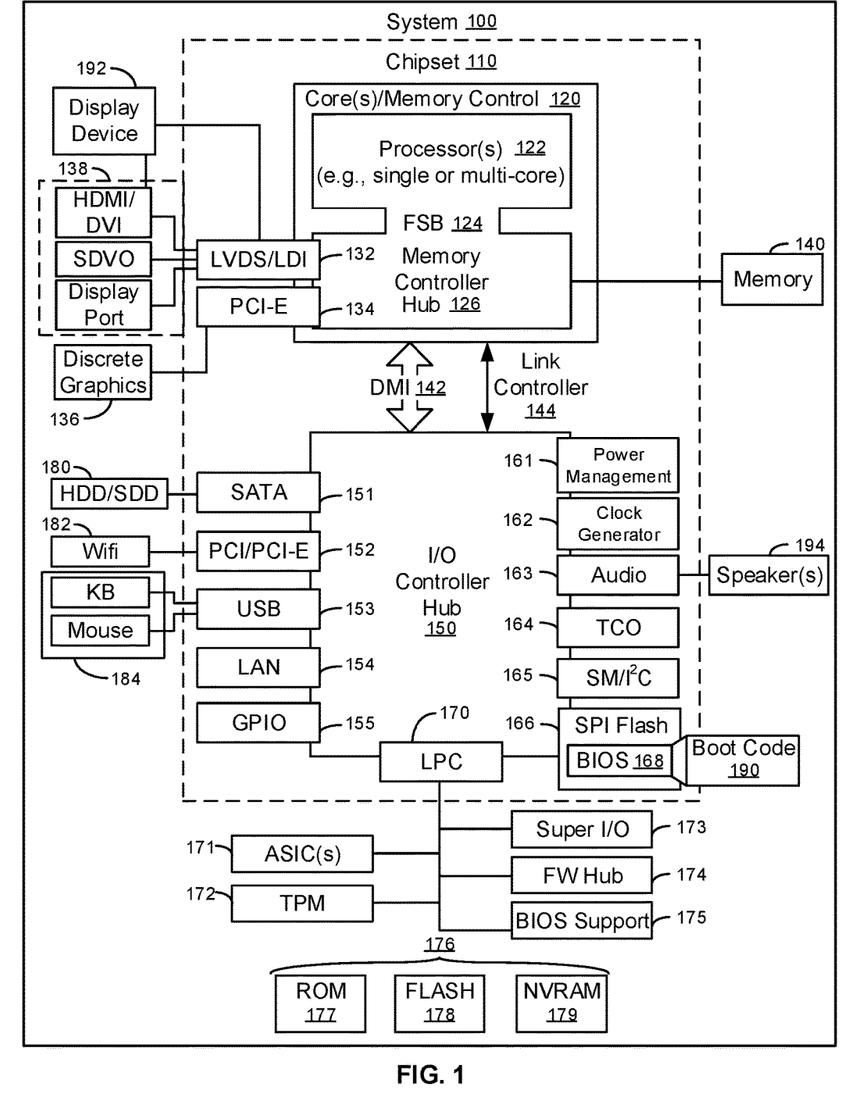
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
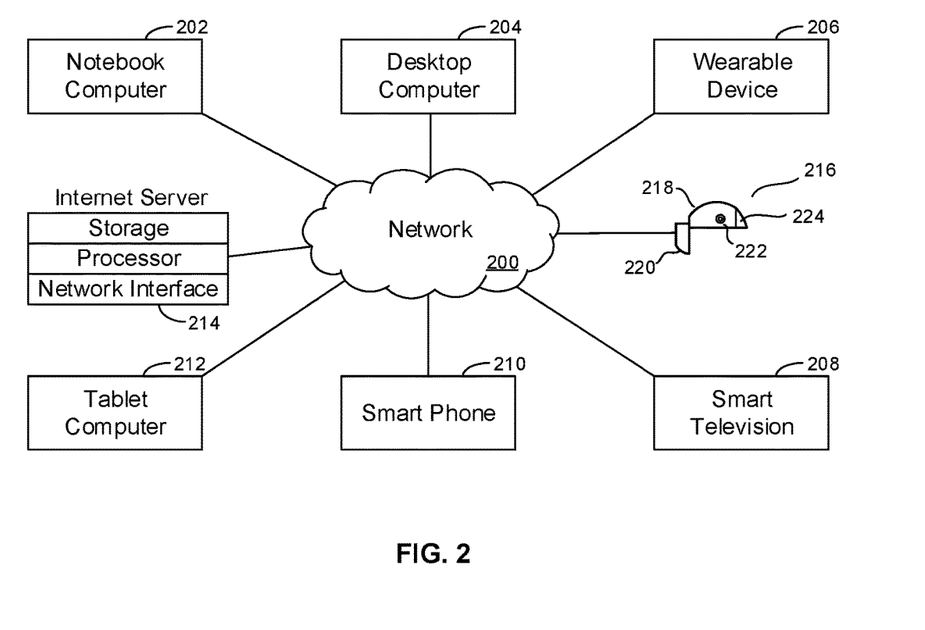
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, and 216. It is to be understood that the devices 202-216 are configured to communicate with each other over the network 200 to undertake present principles.

Describing the headset 216 in more detail, it may include a housing 218 to which a display device 220 is coupled for presenting virtual reality (VR) and/or augmented reality (AR) content as well as other information, images and video data. Thus, in some embodiments the display device 220 may include an at least partially transparent display through which a wearer of the headset may view real-world objects and on which the headset 216 may present AR objects. In other embodiments, the display device 200 may include a VR display.

The headset 216 may also include a speaker 222 that may be similar in function and configuration to the speaker(s) 194, as well as one or more sensors 224, such as a camera or biometric sensor, for identifying a user of the headset 216. Note that though not shown for clarity, the headset 216 may include still other components such as a network interface for wired and/or wireless communication with the other devices of FIG. 2 via the Internet, a local area network (LAN), a Bluetooth network, etc. The headset 216 may also include position sensors for sensing a location and orientation of the headset 216, such as a GPS transceiver, an accelerometer, and a gyroscope.

Note that while a VR/AR headset is described above, other types of headsets and other devices may also be used in accordance with present principles, such as electronic glasses and other devices using so-called "heads up" displays and transparent displays. Other types of non-headset devices may also be used, such as smartphones, tablets, etc. that execute augmented reality software such as Google's Tango AR software.

Figure 3:
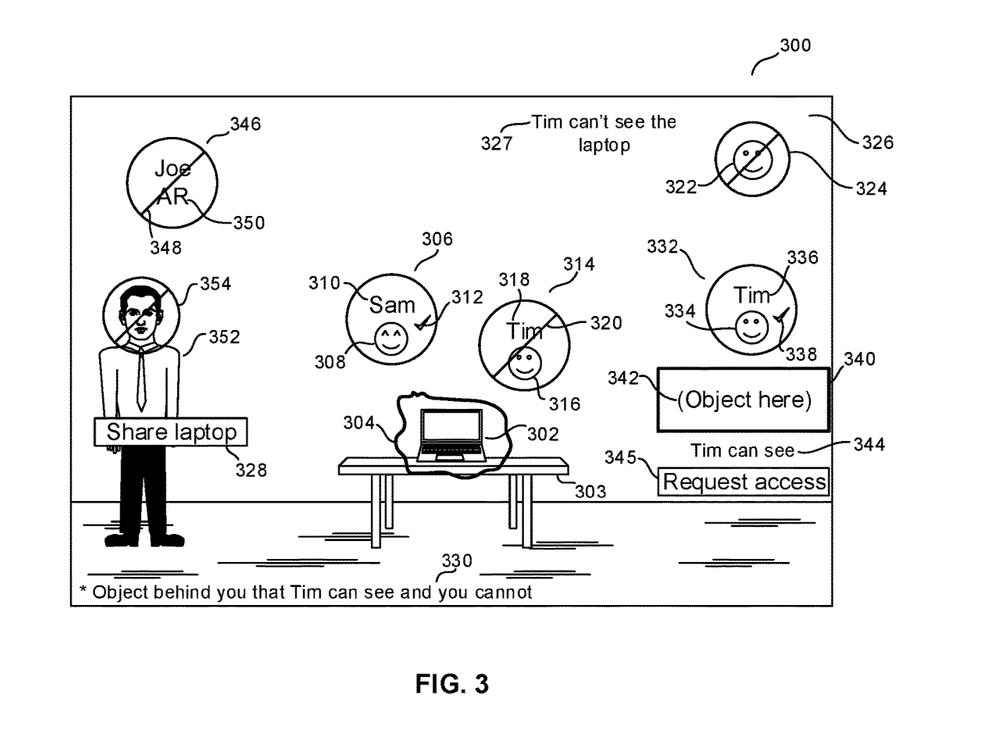
FIG. 3 is an illustration of a field of view of a user through an augmented reality headset display.

Now describing FIG. 3, it shows an example field of view 300 of a user while, for example, wearing an AR headset having a first transparent display through which the real world may be viewed and on which virtual objects can be presented using AR processing so that those objects seem as though they are within the real world. A first augmented reality object and/or virtual object 302 is shown as disposed on a real-world table 303 occupying physical space in front of the user. As may be appreciated from FIG. 3, the virtual object 302 is a laptop computer. An aura 304, which may change between different colors at regular intervals, is presented using the first display so that it appears as though surrounding the virtual object 302 to indicate that the object 302 is in fact a virtual object and not a real-world object occupying physical space in the user's real-world environment.

FIG. 3 also shows a first visual indication 306 that includes a graphic (in this case, an icon) 308 and text 310 that are each associated with a particular user named Sam. The indication 306 may be presented adjacent to the laptop 302 so that, for example, no matter where the user moves within the real-world environment in which he or she is in, the indication 306 appears in the real world to be no more than a threshold distance away from the virtual object 302, even though both the indication 306 and laptop 302 are virtual. Check mark 312 indicates that Sam can see the virtual object 302 using a second display of a second device that Sam is using, it being understood that Sam may also be in the same real-world environment as the user. Thus, because of Sam's icon 308 being previously associated with Sam, and/or based on the text 310 being presented, the user may see the check mark 312 and recognize that Sam can see the same virtual object 302 as the user even though they are viewing it using different devices.

A second indication 314 is also shown that may also be presented as though being disposed no more than the threshold distance away from the virtual object 302. Indication 312 includes an icon 316 and text 318 associated with a particular user named Tim. "No" symbol 320 indicates that Tim cannot see the virtual object 302 using a third display of a third device that Tim is currently using to view the real-world environment he is in with the user. The user, using the AR headset, may thus see the no symbol 320 as being superimposed over Tim's icon 316 and recognize that Tim cannot see the virtual object 302 using the third device.

In some embodiments, additional indications/notifications for other people in the room with the user may be presented in or near a corner of the field of view 300 rather than adjacent to the virtual object 302 itself. For example, another icon 322 for Tim may be presented in a top right corner area 324 of the field of view 300. The icon 322, the no symbol 326 surrounding the icon 322, and/or text 327 (indicating "Tim can't see the laptop") may, when viewed by the user using the AR headset, thus be viewed so that the user can recognize that Tim cannot see the virtual object 302 using the third device. Additionally, though not shown for clarity, in some embodiments the area 324 may present indications for other people that can see the virtual object 302.

If the user wanted to "share" the virtual object 302 with Tim so that Tim could see it sitting on the table 303, the user may select the share selector 328 that is presented on the transparent display of the user's AR headset while the user views the field of view 300. The selector 328 may be selected using an audible command (such as "share the virtual object with Tim"), or may be selected by the user staring at the selector 328 for at least a threshold amount of time, for example. Responsive to the selector 328 being selected, the AR headset may transmit a command to, for example, a cloud service managing virtual objects for the cloud service to permit the virtual object 302 to be observable by Tim using the third device.

Still in reference to FIG. 3, in some embodiments indications/notifications may be presented using the AR headset so that the user can recognize that there are virtual objects "in" the room that the user cannot see. For example, a text indication 330 may be presented in a bottom area of the field of view 300 that indicates there is an object behind the user that Tim can see but that the user cannot see.

As another example, an indication 332 including an icon 334 for Tim and text 336 indicating Tim's name may also be presented that, via check mark 338, indicates that a virtual object is being viewed by Tim using the third device and hence "exists" in the environment. However, the user does not currently have permission to see this virtual object, and so a generic box symbol 340 and "(object here)" text 342 is presented as a visual indication of the location within the environment of the object that Tim can see but the user cannot see. Text 344 also indicates that Tim can see the virtual object, and selector 345 may be selected to request access to the virtual object that Tim can see.

Some users may not have the ability to see virtual objects at all. For example, a user named Joe may have a smartphone that does not have AR capabilities, even though Joe might still be in the same environment with the user, Sam, and Tim. So that the user may be made aware of this, a visual indication 346 may be presented that includes a no symbol 348 and "Joe AR" text 350 to indicate that Joe does not have AR viewing ability using his own device, and hence cannot see virtual objects presented as though existing within the environment.

Also shown in the field of view 300 is a real world person 352. The user's device may recognize the person 352 using input from a camera on the user's device, and then determine, for example, that the person 352 cannot see the virtual object 302 based on permissions for the virtual object 302. Accordingly, a virtual indication 354 may be presented over the real-world face of the person 352 to indicate that the person 352, despite wearing an AR headset as shown, cannot see the virtual object 302.

Figure 4:
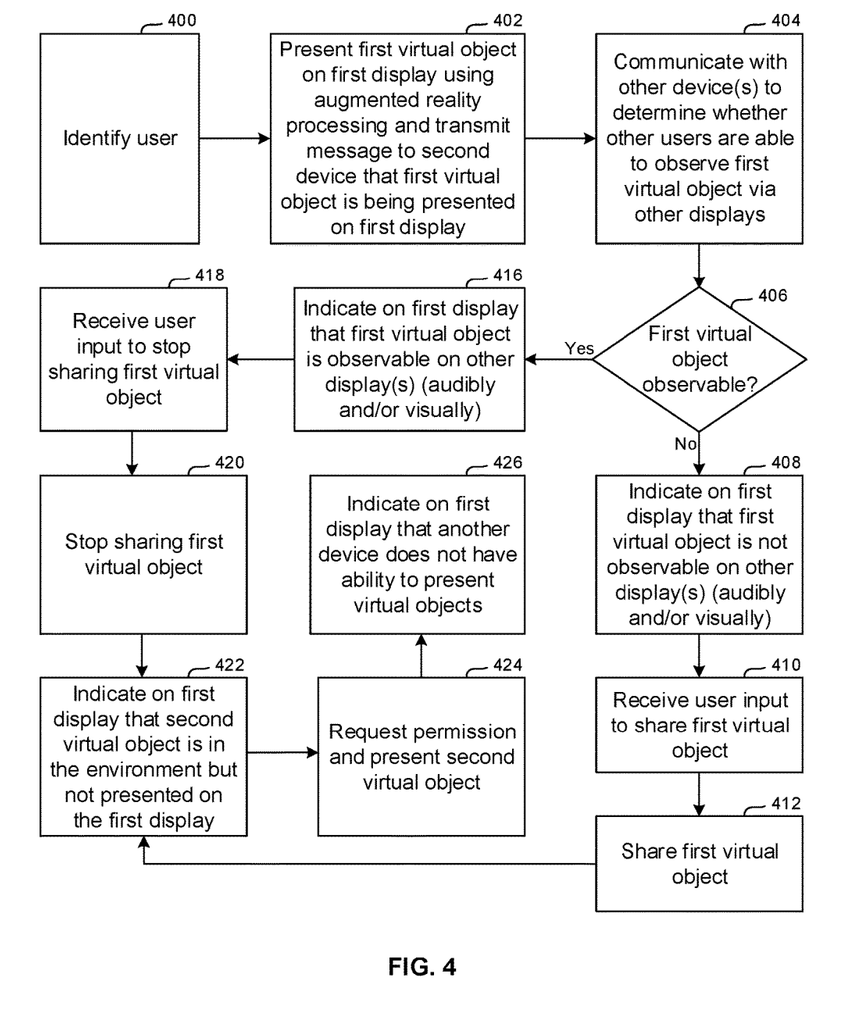
FIGS. 4 and 5 are flow charts of example algorithms in accordance with present principles.

Referring now to FIG. 4, it shows example logic that may be executed by a device such as the system 100 and/or an AR/VR headset in accordance with present principles. The device executing the logic of FIG. 4 will be referred to below as the "first device" for clarity.

Beginning at block 400, the logic identifies a user of the first device. This may be used to inform other people and their respective headsets of the device that the user is wearing, which can in turn be used for determining whether or not the user can see various virtual objects and hence for determining corresponding indications to present.

From block 400 the logic may proceed to block 402. At block 402 the logic may, using augmented reality software, present a first virtual object on a display of the first device (referred to below as the "first display"). Also at block 402, the logic may transmit a message to a second device that is in communication with the first device and that is also determined by the first device to be within the same environment as the first device (e.g., room of a building). The message may indicate that the first virtual object is being presented using the first display, and the message may be transmitted over Wi-Fi, using Bluetooth communication, etc. Once the second device receives the message, it may be used by the second device to determine that an indication may be presented using a display of the second device (referred to as the "second display") that indicates that the user of the first device can see the first virtual object.

From block 402, the logic may proceed to block 404. At block 404 the logic may communicate with other devices, such as the second device, to determine whether users of those devices are able to observe the first virtual object via respective displays of those devices. For instance, at block 404 a cloud server may be communicated with that is receiving data from each device pertaining to what is being viewed, and that manages permissions for the virtual objects and manages the virtual objects themselves. The cloud server may communicate with the first device to inform the first device of which users are able to view which objects. Direct communication between the respective user devices may also be used for exchanging such information.

From block 404 the logic may proceed to decision diamond 406. At diamond 406 the logic may determine, based on the communication at block 404, whether the first virtual object is observable by others, such as the person using the second device via the second display. Responsive to a negative determination at diamond 406, the logic may proceed to block 408. At block 408 the logic may present an indication using the first device that the first virtual object is not observable on the second display. The indication presented at block 408 may be presented on the first display, and/or may be presented audibly via a speaker on the first device (e.g., "Tim cannot see the laptop"). A haptic indication using a vibration generator on the first device may also be used.

From block 408 the logic may proceed to block 410. At block 410 the logic may receive user input to share the first virtual object with the other people, such as the person using the second device, so that those people may view the first virtual object as though within the same real world environment, but using their own respective AR devices. Responsive to receipt of the user input at block 410, the logic may move to block 412 where the logic may share the first virtual object by transmitting it and its properties to those other devices, and/or where the logic may change a permission for the first virtual object so that it may otherwise be accessed by the other devices for presentation. The logic may then proceed to block 422, which will be described shortly.

Referring back to decision diamond 406, if an affirmative determination is made instead of a negative one, the logic may instead proceed from diamond 406 to block 416. At block 416 the logic may present one or more indications on the first display that the first virtual object is observable by one or more other people using their respective devices. The logic may then proceed to block 418 where the logic may receive user input to stop sharing the first virtual object with the other people. Then at block 420, responsive to receipt of the user input at block 418, the logic may stop sharing the first virtual object by revoking permission for the other people's devices to present the first virtual object, or by otherwise changing a permission for the first virtual object so that it may not be accessed by the other devices for presentation.

From block 420 the logic may proceed to block 422. At block 422 the logic may determine that a second virtual object "in" the user's environment is being presented on another person's device but that the first device is not able to present it for viewing by the user. Thus, also at block 422, the logic may present an indication that a second virtual object exists within the environment but is not observable by the user using the first device. The logic may then move to block 424 where the logic may transmit a request for permission to access the second virtual object for presentation at the first device.

Figure 5:
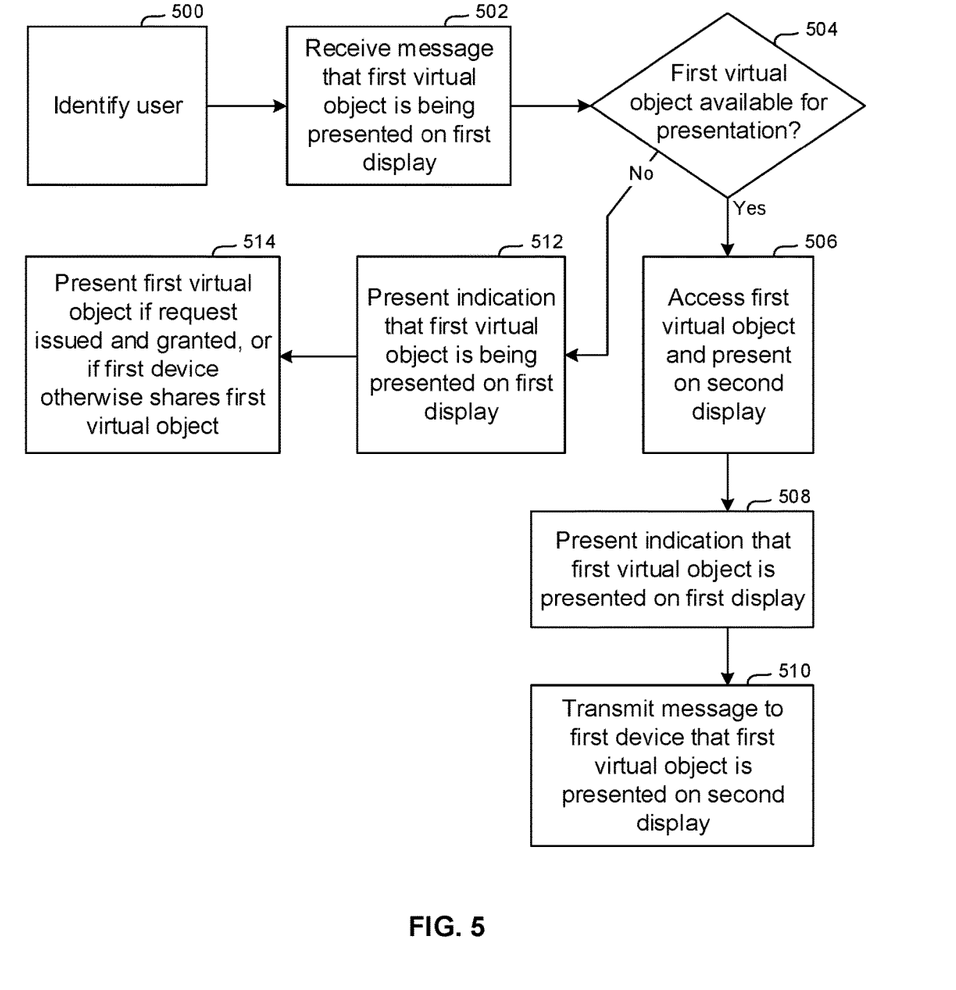

Reference is now made to FIG. 5. It shows example logic that may be executed by the second device described above in reference to FIG. 4 in accordance with present principles. Beginning at block 500, the logic identifies the user of the second device so other people, via their respective headsets, and any other device that is assisting with the AR (such as a server) can be informed that the user is wearing the second device.

From block 500 the logic may proceed to block 502. At block 502 the logic may receive a message from the first device that the first virtual object is being presented on the first display of the first device. The logic may then move to decision diamond 504.

At diamond 504 the logic may determine whether the first virtual object is available for presentation using the second device. For example, a request for the virtual object may be made to the cloud server described above, and a response may be received from the cloud server based on the permissions for the first virtual object. A request for the first virtual object may also be transmitted to the first device itself. In either case, the response that is received may include data for presenting the first virtual object, or the response may deny permission to access the first virtual object, depending on the current permissions for the first virtual object itself.

Responsive to an affirmative determination at diamond 504, the logic may move to block 506. At block 506 the logic may access the first virtual object at the server, by receiving it from the server or first device, etc. Also at block 506, the logic may present the first virtual object on the second display of the second device. From block 506 the logic may then move to block 508. At block 508 the logic may present an indication on the second display that the first virtual object is being presented on the first display.

The logic may then move from block 508 to block 510 where the logic may transmit a message to the first device that indicates that the first virtual object is presented on the second display. This will inform the first device that the first virtual object is presented on the second display so that the first device can present or update indications it is presenting accordingly.

Referring back to decision diamond 504, if a negative determination is made instead of an affirmative one, the logic may move from diamond 504 to block 512. At block 512 the logic may present an indication at the second device that the first virtual object is being presented on the first display. The logic may then move to block 514 where the logic may present the first virtual object using the second display if and when permission is granted to the second device to do so, or if the first device otherwise makes the first virtual object accessible to the second device at a later time.

Figure 6:
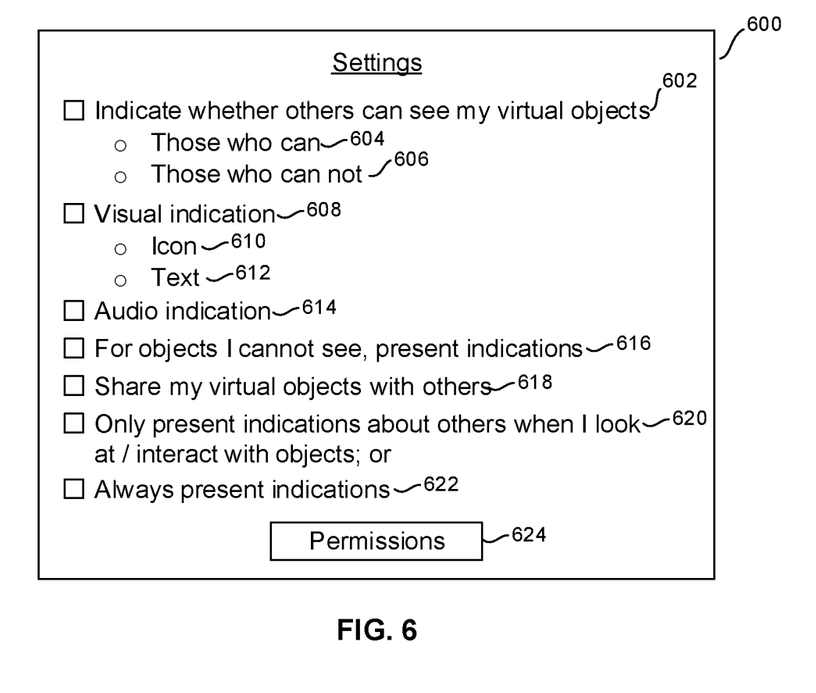
FIGS. 6 and 7 are example user interfaces (UIs) in accordance with present principles.

Continuing the detailed description in reference to FIG. 6, it shows a settings user interface (UI) 600 that may be presented on a display of a device undertaking present principles. Each option/sub-option to be discussed below may be selected by directing input (e.g., touch input, eye input, etc.) to the respective check box or radio button shown adjacent to the option.

The UI 600 may include a first option 602 that is selectable to enable indications concerning whether other users, using other devices, can see virtual objects that are seen using the user's device. The first option 602 may include a sub-option 604 that is selectable to enable presentation of indications for those who can see the same virtual object as the user, and a sub-option 606 that is selectable to enable presentation of indications for those who cannot see the same virtual object as the user.

The UI 600 may also include a second option 608 that is selectable to enable presentation of visual indications at the user's device. The option 608 may include a sub-option 610 that is selectable to enable presentation of icons as part of the visual indications to be presented, as well as a sub-option 612 that is selectable to enable presentation of text as part of the visual indications to be presented. The UI 600 may further include an option 614 that is selectable to enable presentation of audio indications at the user's device, such as via a speaker on the user's device.

The UI 600 may also include an option 616 that is selectable to enable presentation of indications for virtual objects within the user's environment that the user cannot see using his or her own device. An example of one such indication would be a generic box appearing to be located within the real world where a virtual object seen by someone else would otherwise appear.

Still in reference to FIG. 6, the UI 600 may also include an option 618 that is selectable to enable sharing/permission granting of virtual objects presented using the user's device by other people using their own respective devices. If the option 618 were not selected, for example, then virtual objects presented using the user's device would not be observable at other devices absent specific permission for that particular virtual object to be shared as set forth herein.

The UI 600 may include an option 620 as well. The option 620 is selectable to enable presentation of indications at the user's device when the user interacts with a given virtual object, where the indications pertain to whether other users can also see the virtual object using their devices. An option 622 may also be presented, which may be selected instead of option 620 and which enables presentation of indication at all times as opposed to merely when the user interacts with (e.g., looks at) the virtual object.

Figure 7:
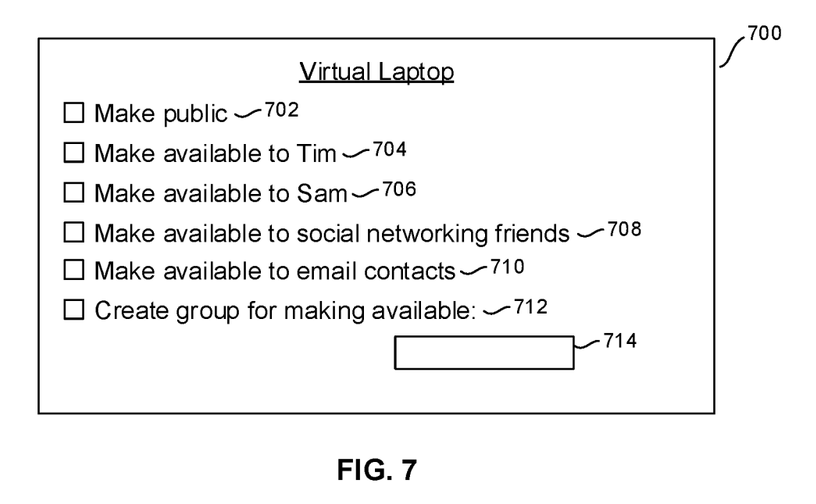

Even further, the UI 600 may include a selector 624 that is selectable to provide a command for the device to present another UI at which permissions may be managed for all objects accessible to the device and/or owned by the user, or for one such specific object. An example of such a UI is shown in FIG. 7, which shows a UI 700.

The UI 700 may be for managing permissions for a particular virtual object such as the virtual laptop 302, and hence may be presented responsive to selection of selector 328. However, it is to be further understood that in other embodiments, selection of selector 328 may cause automatic sharing of the virtual laptop without presentation of the UI 700.

In any case, the UI 700 may include a first option 702 that is selectable to configure permissions for the virtual laptop so that it is publically accessible. The UI 700 may also include a second option 704 that is selectable to configure permissions for the virtual laptop so that it is accessible to the specific user named Tim, while a third option 706 may also be presented that is selectable to configure permissions for the virtual laptop so that it is accessible to the specific user named Sam.

Furthermore, the UI 700 may include an option 708 that is selectable to configure permissions for the virtual laptop so that it is accessible to a user's social networking friends on a particular social networking service, as determined based on access by the device to the social networking service. The UI 700 may further include an option 710 that is selectable to configure permissions for the virtual laptop so that it is accessible to a user's email contacts, as determined based on access by the device to a given email account associated with the user.

If desired, the UI 700 may even include an option 712 that is selectable to configure permissions for the virtual laptop so that it is accessible to a user-designated set of people. The user may designate people for the set by providing input of such people to the inbox box 714.

Note that although the UI 700 has been descried above as for managing permissions for a specific virtual object (the virtual laptop), a UI having options similar the ones shown in FIG. 7 may also be presented responsive to selection of the selector 624 so that permissions may be managed for all objects controlled by the user's device or otherwise owned by the user, rather than for a specific virtual object.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   a housing;
   at least one processor coupled to the housing;
   a first display coupled to the housing and accessible to the at least one processor; and
   storage coupled to the housing and accessible to the at least one processor; the storage bearing instructions executable by the at least one processor to:
   present, on the first display, an augmented reality object; and
   visually indicate, on the first display and responsive to identification of user interaction with the augmented reality object, whether the augmented reality object is observable via a second display of a second device that is different from the first device, the visual indicating not being performed prior to identification of user interaction with the augmented reality object.

2. The first device of claim 1, wherein the instructions are executable by the at least one processor to:
   visually indicate, on the first display, whether the augmented reality object is observable via the second display by presenting a generic icon in place of the augmented reality object, the generic icon being different from the augmented reality object, the augmented reality object not being presented while the genetic icon is presented, the generic icon presented to appear as though at a location in the real world at which the augmented reality object would otherwise appear to be located.

3. The first device of claim 1, wherein the instructions are executable by the at least one processor to:
   determine whether the augmented reality object is observable via the second display at least in part based on communication of the first device with the second device.

4. The first device of claim 1, wherein the first device is a headset and wherein the first display is an at least partially transparent display on which augmented reality objects can be presented.

5. The first device of claim 1, wherein the instructions are executable by the at least one processor to:
   audibly indicate whether the augmented reality object is observable via the second display.

6. The first device of claim 1, wherein the instructions are executable by the at least one processor to:
   indicate, via the first device, whether the second device is able to present augmented reality objects.

7. The first device of claim 1, wherein the augmented reality object s a first augmented reality object, and wherein the instructions are executable by the at least one processor to:
   visually indicate, on the first display, that a second augmented reality object is observable via the first display but is not presented on the first display.

8. The first device of claim 1, wherein the augmented reality object is presented on the first display using augmented reality processing.

9. The first device of claim 1, wherein the instructions are executable by the at least one processor to:
   identify user interaction with the augmented reality object at least in part by identifying a user as looking at the augmented reality object.

10. The first device of claim 1, wherein the instructions are executable by the at least one processor to:
    identify user interaction with the augmented reality object at least in part by identifying a user as talking about the augmented reality object.

11. The first device of claim 1, wherein the instructions are executable by the at least one processor to:
    identify user interaction with the augmented reality object at least in part by identifying a user as pointing at the augmented reality object as it appears to the user to exist within the real world.

12. A method, comprising:
    presenting, on a first display of a first device, an augmented reality object; and
    visually indicating, on the first display and responsive to identification of user interaction with the augmented reality object, whether the augmented reality object is observable via a second display of a second device that is different from the first device, the visual indicating not being performed prior to identification of user interaction with the augmented reality object.

13. The method of claim 12, comprising:
    visually indicating, on the first display, whether the augmented reality object is observable via the second display by presenting a generic icon in place of the augmented reality object, the generic icon being different from the augmented reality object, the augmented reality object not being presented while the generic icon is presented, the generic icon presented to appear as though at a location in the real world at which the augmented reality object would otherwise appear to be located.

14. The method of claim 12, comprising:
    determining whether the augmented reality object is observable via the second display at least in part based on communication of the first device with the second device; and
    performing the visually indicating using augmented reality processing.

15. The method of claim 12, wherein the first device is a headset and wherein the first display is an at least partially transparent display on which augmented reality objects are presentable.

16. The method of claim 12, comprising:
    audibly indicating whether the augmented reality object is observable via the second display.

17. The method of claim 12, comprising:
- indicating, via the first device, whether the second device is able to present augmented reality objects.

18. The method of claim 12, wherein the augmented reality object is a first augmented reality object, and wherein the method comprises:
- visually indicating, on the first display, that a second augmented reality object is observable via the first display but is not presented on the first display.

19. The method of claim 12, comprising:
- identifying user interaction with the augmented reality object at least in part by: identifying a user as talking about the augmented reality object, and/or identifying the user as pointing at the augmented reality object as it appears to the user to exist within the real world.

20. An apparatus, comprising:
- a first processor;
- a network adapter; and
- storage bearing instructions executable by a second processor of a first device for:
- presenting, on a first display accessible to the second processor, an augmented reality object; and
- presenting, on the first display and responsive to identification of user interaction with the augmented reality object, a visual indication regarding whether the augmented reality object is observable via a second display of a second device that is different from the first device, the visual indication not being presented on the first display prior to identification of user interaction with the augmented reality object;
- wherein the first processor transfers the instructions to the first device over a network via the network adapter.

* * * * *